(No Model.)
C. B. TRUMBLE.
ANIMAL TRAP.
No. 465,418.  Patented Dec. 15, 1891.
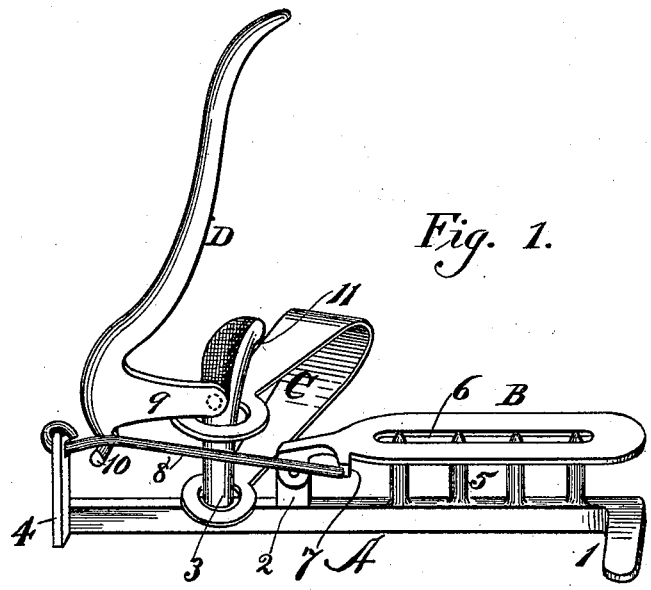
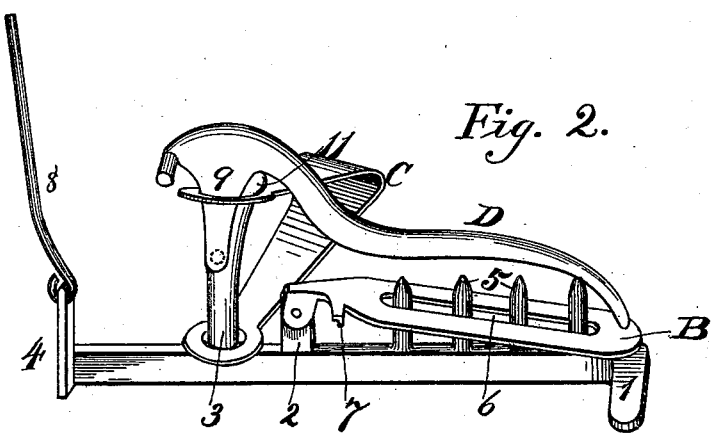

UNITED STATES PATENT OFFICE.

CHAUNCEY B. TRUMBLE, OF GROTON, NEW YORK.

ANIMAL-TRAP.

SPECIFICATION forming part of Letters Patent No. 465,418, dated December 15, 1891.

Application filed March 21, 1891. Serial No. 385,902. (No model.)

*To all whom it may concern:*

Be it known that I, CHAUNCEY B. TRUMBLE, of Groton, in the county of Tompkins, in the State of New York, have invented new and useful Improvements in Animal-Traps, of which the following, taken in connection with the accompanying drawings, is a full, clear, and exact description.

My invention relates to animal-traps.

My object is to produce an improved trap adapted to be tripped and sprung by the weight of the animal stepping onto the pan, and which is provided with a pivoted arm, which operates as a hand-lever in compressing the spring for setting, and also operates as one jaw when the trap is sprung, and in which the pan is simply a pan when the trap is set and constitutes the other jaw when the trap is sprung, in which the pan is slotted or perforated to permit teeth to project above it when the trap is sprung, said teeth and jaws and their supports, as well as the trigger-post, being carried by a suitable base.

My invention consists in the several novel features of construction and operation hereinafter described, and which are specifically set forth in the claim hereunto annexed. It is constructed as follows, reference being had to the accompanying drawings, in which—

Figure 1 is a side perspective elevation of the trap set. Fig. 2 is a like view of the same sprung.

A is the base, provided on one or both ends with side arms 1, which hold the body erect. This base is provided with the pan-post 2, spring-post 3, and trigger-post 4, all of which are vertical, and also with the vertical teeth 5.

B is the pan hinged at one end to the post 2 and provided with a longitudinal slot 6 or row of perforations, and also with a side lug or shoulder 7, with which the trigger 8 engages in setting the trap, said trigger being hinged or pivotally connected to the post 4.

C is the spring, of substantially U form, having eyes in the ends of its arms, which fit loosely over the post 3, one arm bearing upon the base.

D is the setting-lever and upper jaw combined, of substantially the L form shown, pivoted upon the post 3 and having the arm 9, adapted to engage with the upper arm of the spring, and being also provided with a stud 10 on its side, which is the fulcral bearing of the trigger, which thus holds the lever-jaw upright, as shown in Fig. 1. The post 3 is cut away on its upper end like a rabbet, so that when the trap is sprung the arm 9 will lie substantially flush with the contour of said post, so that the upper arm of the spring can rise freely over part of it at least, or until it engages with the widened out rear side of said arm and locks the jaw down, as shown in Fig. 2. The top of this post can be curved over on one side and provided with a lip 11, with which the upper arm of the spring will engage as a stop.

To set the trap I raise the end of the jaw-lever D, compressing the spring until the trigger can lie upon the fulcrum-stud, raise the pan-jaw, and bring the end of the trigger into engagement with the shoulder on the pan. When thus set, the teeth are substantially flush with the top of this pan or lower jaw, and when sprung the teeth will protrude through this jaw, then depressed, and the animal will be impaled upon them and held between the jaws.

It will be seen that for some small animals the teeth will not be necessary, the lever-jaw being changed in form, so that it will bear closely against the pan-jaw.

What I claim as my invention, and desire to secure by Letters Patent, is—

A trap comprising a base-piece provided with upright teeth, three vertical posts on said base-piece, a slotted pan mounted on one of said posts and provided with a side lug, a U-shaped spring having eyes fitting over the intermediate posts, a bell-crank lever fulcrumed on the intermediate posts, said lever being provided with a lug, and a trigger mounted on the three posts adapted to rest above the lug of the lever and to engage the lug on the pan, as described.

In witness whereof I have hereunto set my hand this 17th day of March, 1891.

CHAUNCEY B. TRUMBLE.

In presence of—
HOWARD P. DENISON,
C. W. SMITH.